(12) United States Patent
Wong et al.

(10) Patent No.: US 11,886,030 B2
(45) Date of Patent: Jan. 30, 2024

(54) OPTICAL FIBER CONNECTOR WITH IMPROVED CABLE RETENTION STRENGTH

(71) Applicant: Senko Advanced Components, Inc., Marlborough, MA (US)

(72) Inventors: Yim Wong, Kowloon (HK); Siu Kei Ma, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/742,552

(22) Filed: May 12, 2022

(65) Prior Publication Data

US 2022/0365308 A1  Nov. 17, 2022

Related U.S. Application Data

(60) Provisional application No. 63/188,790, filed on May 14, 2021.

(51) Int. Cl.
  *G02B 6/44* (2006.01)
  *G02B 6/38* (2006.01)

(52) U.S. Cl.
  CPC ......... *G02B 6/4471* (2013.01); *G02B 6/3847* (2013.01); *G02B 6/38875* (2021.05)

(58) Field of Classification Search
  CPC . G02B 6/3847; G02B 6/38875; G02B 6/4471
  See application file for complete search history.

(56) References Cited

U.S. PATENT DOCUMENTS

| RE37,080 | E | 3/2001 | Stephenson et al. |
| 7,614,797 | B2 * | 11/2009 | Lu .................. G02B 6/3894 385/94 |
| 2007/0104425 | A1 | 5/2007 | Larson et al. |
| 2010/0272400 | A1 | 10/2010 | Bieber et al. |
| 2018/0156988 | A1 | 6/2018 | Gniadek et al. |
| 2019/0072733 | A1 | 3/2019 | Ramasubramanian |
| 2021/0132300 | A1 | 5/2021 | Isenhour et al. |

OTHER PUBLICATIONS

PCT International Searching Authority, International Search Report and Written Opinion, PCT Application No. PCT/US22/28987, dated Aug. 16, 2022, 7 pages.

* cited by examiner

*Primary Examiner* — Sung H Pak (57) ABSTRACT

In a connector for terminating a cable, a connector housing has a rear end portion including a first shoulder. An inner connector assembly is received in the connector housing. The inner connector assembly includes at least one ferrule exposed and a back body with a back post. At least one strength member is secured to the back post. A rear bracing member is received in the connector housing. The rear bracing member has a front end portion and a rear end portion spaced apart along the longitudinal axis. The front end portion of the rear bracing member is configured to engage the back body and the rear end portion of the rear bracing member is configured to engage the first shoulder of the connector housing such that the rear bracing member substantially braces the back body against rearward displacement along the longitudinal axis relative to the connector housing.

7 Claims, 8 Drawing Sheets

OPTICAL FIBER CONNECTOR WITH IMPROVED CABLE RETENTION STRENGTH

CROSS-REFERENCE TO RELATED APPLICATION

This application claims priority to U.S. Provisional Patent Application No. 63/188,790, filed May 14, 2021, which is hereby incorporated by reference in its entirety.

FIELD

This disclosure generally pertains to an optical fiber connector with improved cable retention strength.

BACKGROUND

The prevalence of the Internet has led to unprecedented growth in communication networks. Consumer demand for service and increased competition has driven network providers to continuously search for ways to improve quality of service while reducing cost. Optical communications systems are preferred for some applications because of their bandwidth and reliability. In certain environments, there is a need for more robust optical interconnect components. For example, the inventors have recognized a need for optical fiber connectors that terminate optical fiber cables in such a way as to withstand high tension on the cables.

SUMMARY

In one aspect, a connector for terminating a cable comprises a connector housing having a front end portion and a rear end portion spaced apart along a longitudinal axis. The rear end portion of the connector housing includes a first shoulder. An inner connector assembly is received in the connector housing. The inner connector assembly includes at least one ferrule exposed through the front end portion of the connector housing for making an optical connection. The inner connector assembly further comprises a back body comprising a back post. At least one strength member is secured to the back post. A rear bracing member is received in the connector housing. The rear bracing member has a front end portion and a rear end portion spaced apart along the longitudinal axis. The front end portion of the rear bracing member is configured to engage the back body and the rear end portion of the rear bracing member is configured to engage the first shoulder of the connector housing such that the rear bracing member substantially braces the back body against rearward displacement along the longitudinal axis relative to the connector housing.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
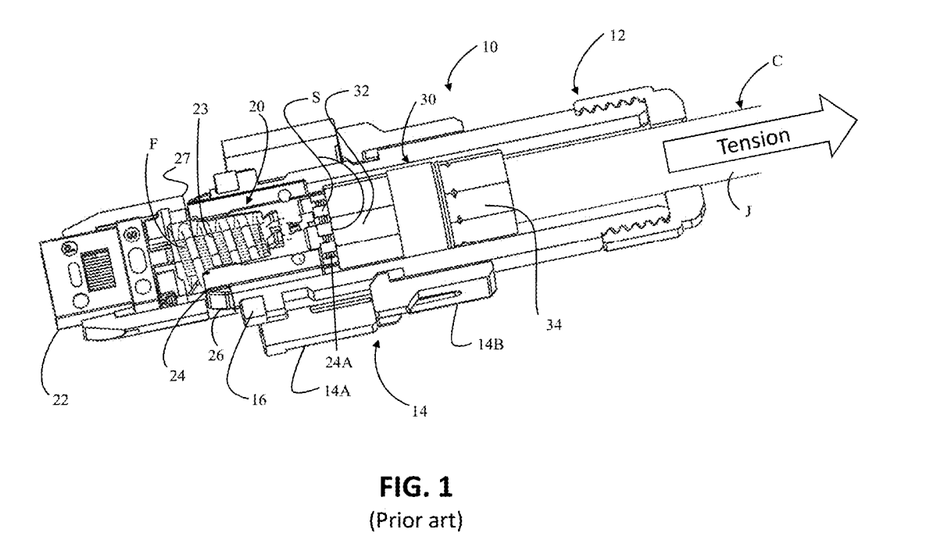
FIG. 1 is a perspective of a hardened optical fiber connector of the prior art with a hardened connector housing thereof shown in horizontal longitudinal section.
Figure 2:
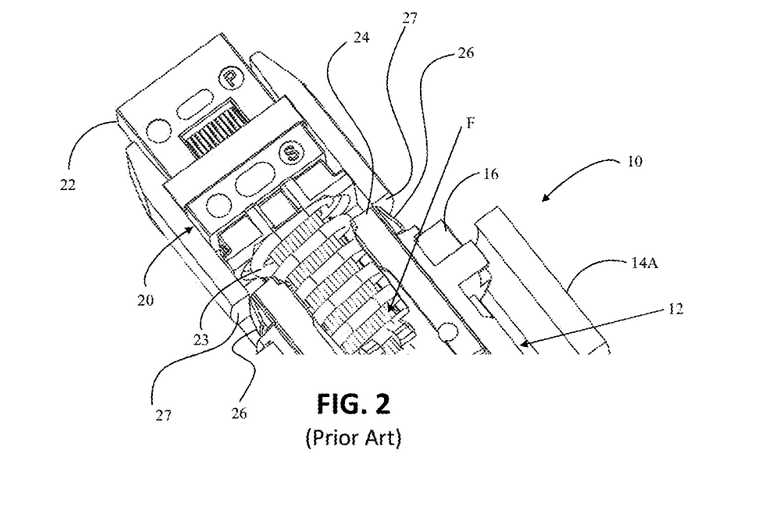
FIG. 2 is an enlarged, fragmentary perspective of the hardened optical fiber connector of the prior art with the hardened connector housing shown in section.
Figure 3:
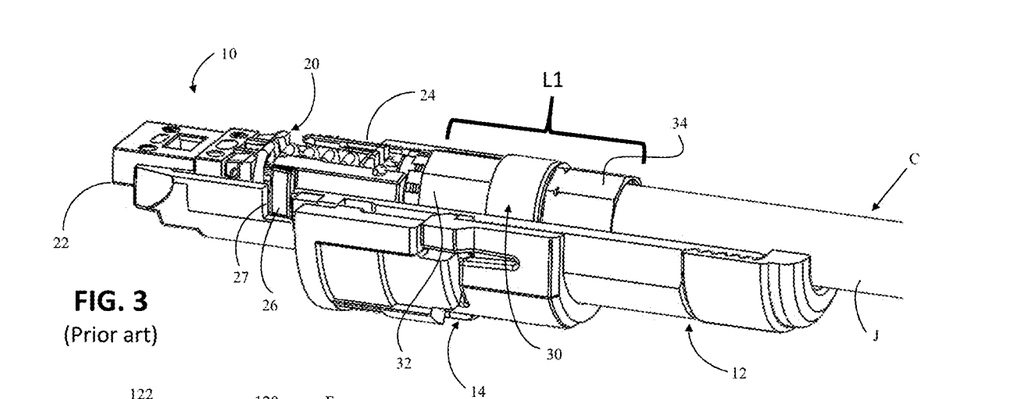
FIG. 3 is another perspective of the hardened optical fiber connector of the prior art with the hardened connector housing shown in horizontal longitudinal section.

Referring to FIGS. 1-3, an optical fiber connector 10 is shown for purposes of comparison with optical fiber connectors in accordance with the present disclosure. As explained more fully below, in comparison with the optical fiber connector 10, it is believed that optical fiber connectors in accordance with the present disclosure have improved cable retention strength, e.g., can withstand greater tension on a cable without sustaining damage or losing the integrity of an optical connection.

The optical fiber connector 10 is a hardened connector of the type that is capable of use in harsh environments such as the outdoors. Optical fiber connectors of this type are described in greater detail in U.S. Patent Application Publication No. 2020/0400897, which is hereby incorporated by reference in its entirety. In general, the hardened connector 10 is configured to terminate an optical fiber cable C comprising one or more optical fibers F, one or more strength members S, and a cable jacket J. The connector 10 comprises a hardened connector housing 12, a fastener 14 (e.g., coupling nut 14A and lock ring 14B) on the hardened connector housing 12 for fastening the connector to an adapter, one or more seals 16 for inhibiting ingress of dust and/or moisture into the connector when the connector is mated with an adapter, an inner connector assembly 20 received in the hardened connector housing. The inner connector assembly 20 includes an optical fiber ferrule 22 for terminating the one or more optical fibers F of the cable, a ferrule spring 23 at the rear end of the ferrule 22, and back body 24 fastened to the hardened connector housing 12 such that the ferrule spring is compressed between the back body and the ferrule to yieldably bias the ferrule forward in the hardened connector housing. The back body 24 comprises first and second latch hooks 26 that latch with recesses 27 in the hardened connector housing 12 to secure the back body to the hardened connector housing.

It is desirable to isolate the sensitive ferrule 22 and fibers F from tension imparted on the cable C during use. In the prior art hardened optical fiber connector 10, a crimp ring 30 is used to transfer forces on the cable C to the hardened connector housing 12, without imparting tension on the sensitive optical fiber ferrule 22. The crimp ring 30 comprises a front portion 32 that is crimped onto a back post 24A of the back body 24. The strength members S of the cable C are sandwiched between the front portion 32 of the crimp ring 30 and the back post 24A. A back portion 34 of the crimp ring 30 is crimped onto the cable jacket J. During use, when tension is imparted on the cable C, the crimp ring 30 transfers the tension to the inner back body 24. The hooks 26 of the back body, in turn, transfer the tension to the hardened connector housing 12. When the fastener 14 is in use, the coupling nut 14A will further transfer the tension to the adapter. Thus cable tension typically is not transferred to the ferrule 22 or the fibers F.

The inventors have recognized, however, that the ability of the crimp ring 30 to protect the sensitive ferrule 22 from cable tension is limited by the hooks 26. The hooks 26 are relatively small plastic features of the back body 24. When substantial tension is imparted on the cable C, the hooks 26 can break. And when the hooks 26 break, the crimp ring 30 cannot effectively transfer cable tension to the hardened connector housing 12. Thus, after the hooks 26 break, tension on the cable can be imparted to the fibers F and ferrule 22, causing failure.

Figure 4:
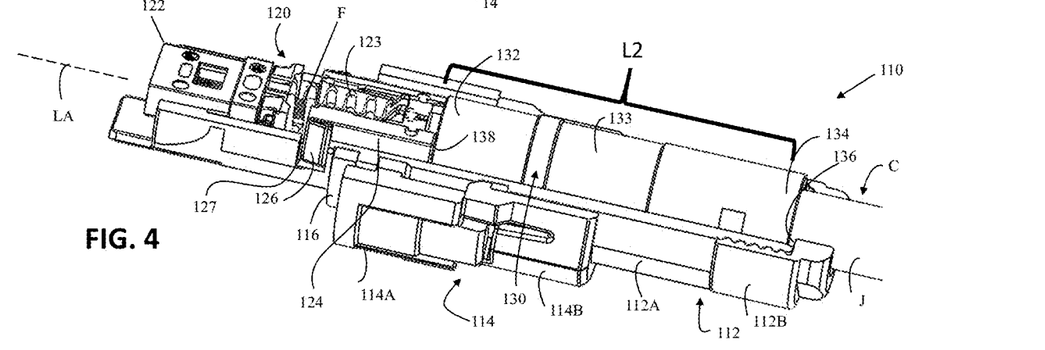
FIG. 4 is a perspective of a hardened optical fiber connector of the present disclosure with a hardened connector housing thereof shown in section.
Figure 5:
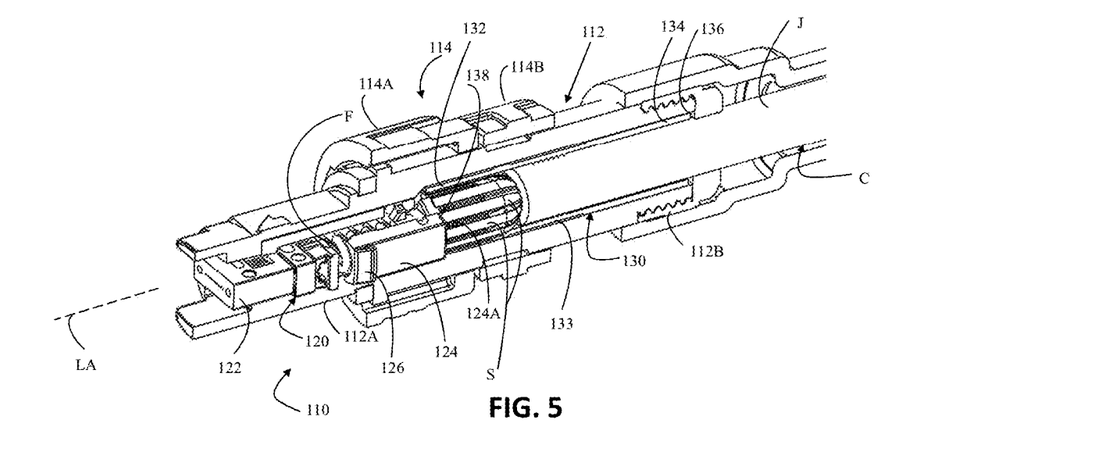
FIG. 5 is fragmentary perspective of the hardened optical fiber connector of FIG. 4 with the hardened connector housing shown in vertical longitudinal section.
Figure 6:
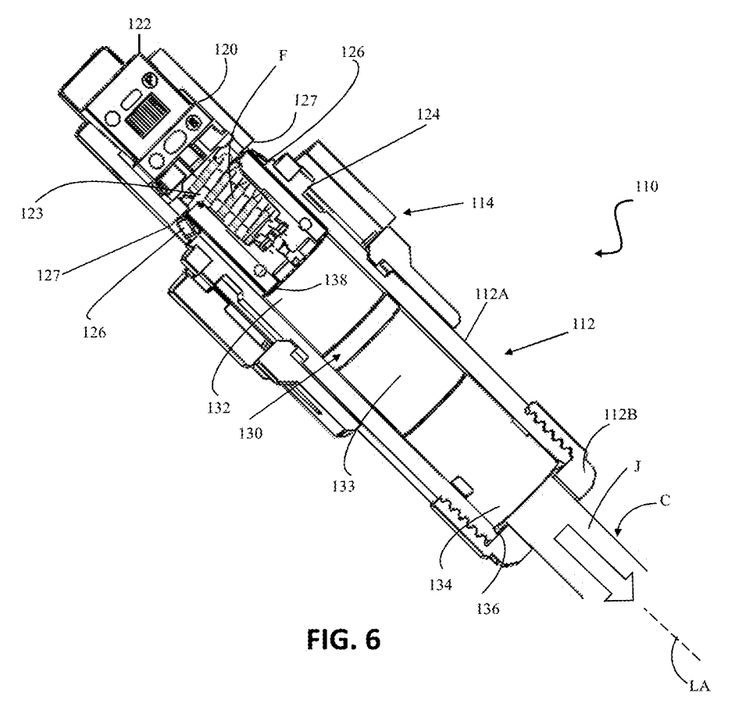
FIG. 6 is another perspective of the hardened optical fiber connector of FIG. 4 with the hardened connector housing shown in horizontal longitudinal section.

Referring to FIGS. 4-6, an exemplary embodiment of a hardened optical fiber connector in accordance with the present disclosure is generally indicated at reference number 110. As will be explained more fully below, in comparison with the connector 10 the connector 110 has greater cable retention strength, e.g., can withstand greater amounts of tension on the cable C without sustaining damage to the sensitive optical fibers F. The optical fiber connector 110 is configured to terminate the same type of optical fiber cable C, which again, comprises one or more optical fibers F, one or more strength members S (FIG. 5), and a cable jacket J. The connector 110 comprises a hardened connector housing 112, a fastener 114 (e.g., coupling nut 114A and lock ring 114B) on the hardened connector housing for fastening the connector to an adapter (not shown), one or more seals 116 for inhibiting ingress of dust and/or moisture into the connector when the connector is mated with an adapter, an inner connector assembly 120 received in the hardened connector housing, and a crimp ring 130. As shown by way of comparison between FIGS. 3 and 4, the prior art crimp ring 30 has a length L1, whereas the crimp ring 130 has a greater length L2 along the longitudinal axis LA of the connector that is greater than the length L1. As explained more fully below, the extended-length crimp ring 130 functions as a bracing member that braces the inner connector assembly 120 against the hardened connector housing 112 when tension is imparted on the cable C.

The hardened connector housing 112 has front end portion and a rear end portion spaced apart along a longitudinal axis LA. The rear end portion of the hardened connector housing comprises a forward facing internal shoulder 136 used with the extended-length crimp ring 130 for bracing the inner connector assembly 120. The hardened connector housing 112 comprises a plug body 112A about the crimp ring 130 and a core holder 112B configured to connect to the plug body (e.g., threadably connect to the rear end portion of the plug body). In the illustrated embodiment, the core holder 112B defines the forward facing internal shoulder 136. The cable C enters the hardened connector 110 through an opening circumscribed by the shoulder 136. The plug body 112A further comprises latch recesses 127 (broadly, latch elements) for latching with the inner connector assembly 120.

Similar to the inner connector assembly 20, the inner connector assembly 120 comprises at least one optical fiber ferrule 122, a ferrule spring 123, and a back body 124. In the illustrated embodiment, the ferrule 122 is an MT ferrule, but it is contemplated that the hardened connector could also be equipped with inner connector assemblies comprising other types of ferrules (e.g., inner connector assemblies comprising (i) an MT ferrule; (ii) an ST ferrule; or (iii) duplex LC ferrules are expressly contemplated herein). The ferrule 122 is exposed through the front end portion of the hardened connector housing 112 for making an optical connection when a front end of the plug body 112A is plugged into an adapter and the coupling nut 114 fastens the connector 110 to the adapter. The back body 124 comprises first and second latch hooks 126 (broadly, latch elements) that latch with the recesses 127 to secure the back body to the hardened connector housing 112. More broadly, the back body 124 comprises a first latch element 126 and the hardened connector housing 112 comprises a complementary second latch element 127 configured to cooperate with the first latch element to secure the back body to the hardened connector housing. The ferrule spring 123 is compressed between the back body 124 and the rear end of the ferrule 122 to yieldably bias the ferrule forward in relation to the back body. The back body 124 comprises a back post 124A on which the at least one strength member S of the cable C can be secured. In addition, the back body 124 comprises a rearward facing shoulder 138 used with the extended-length crimp ring 130 for bracing the inner connector assembly 120.

The crimp ring 130 functions similar to the crimp ring 30 described above, and in addition, is configured to form a rear bracing member for bracing the back body 124 in the hardened connector housing 112. The crimp ring 130 has a front end portion 132 and a rear end portion 134 spaced apart along the longitudinal axis LA. The front end portion 132 is configured to be crimped onto the back post 124A to secure the strength members S of the cable C to the back body. In addition, the front end portion 132 is configured to engage the rearward facing shoulder 138 of the back body 124. In the illustrated embodiment, a middle portion 133 of the crimp ring 130 between the front end portion 132 and the rear end portion 134, is configured to be crimped onto the cable jacket J. The rear end portion 134 of the crimp ring 130 is configured to engage the forward facing shoulder 136 of the hardened connector housing 112.

It can be seen that the extended-length crimp ring 130 extends from a front end portion 132 configured to engage the rearward facing shoulder 138 of the back body 124 to a rear end portion 134 configured to engage the forward facing shoulder 136. The crimp ring 130 therefore functions as a bracing member that substantially braces at least portion of the back body 124 against rearward displacement along the longitudinal axis LA relative to the hardened connector housing 112. During use, when tension is imparted on the cable C, the crimp ring 130 transfers the tension to the inner back body 124, but the hooks 126 do not bear the full load. Instead, the rearward facing shoulder 138 presses backward on the crimp ring 130, which in turn presses backward on the forward facing shoulder 136. The crimp ring 130 transfers the tension load from the cable C to the hardened connector housing 112 via the forward facing shoulder 136, and displacement of the hooks 126 in the recesses 127 is inhibited. Because the forward facing shoulder 136 is more substantial than the hooks 126, the hardened connector 110 can effectively transfer greater cable tension through the hardened connector housing 112 to the adapter without imparting tension on the sensitive fibers F or ferrule 122.

Figure 7:
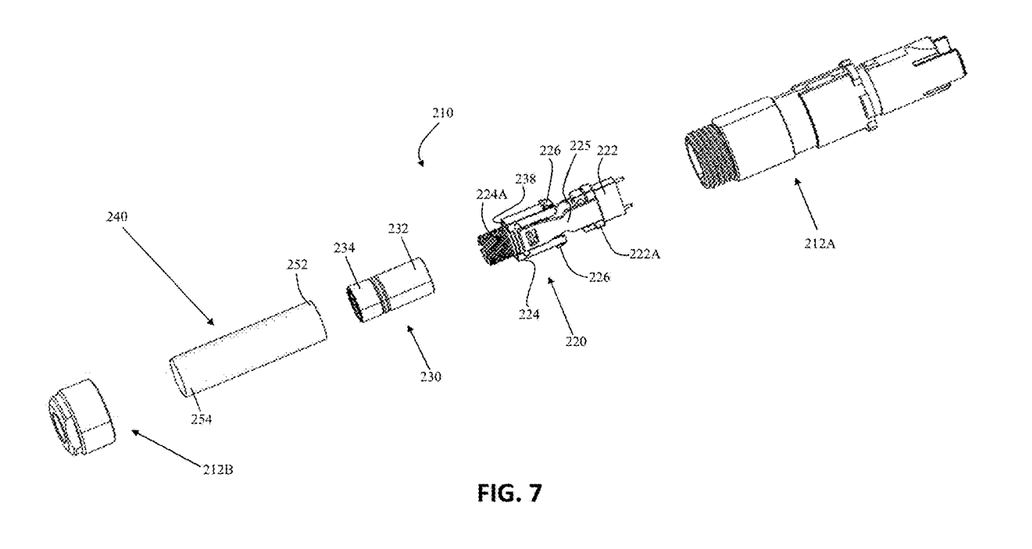
FIG. 7 is an exploded perspective of another hardened optical fiber connector of the present disclosure with external components such as a fastener and a seal removed.
Figure 8:
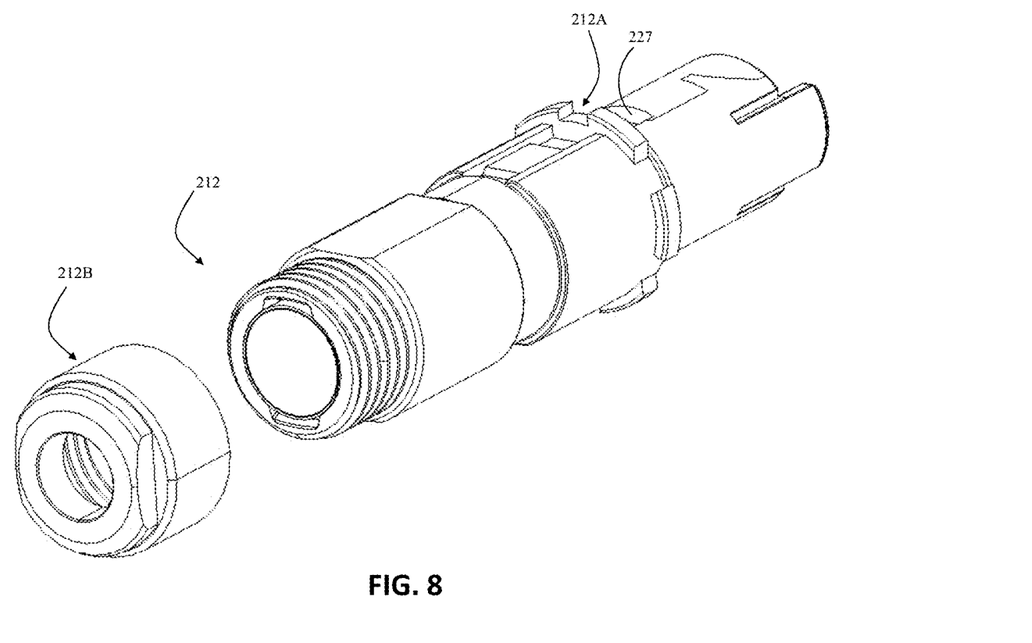
FIG. 8 is an exploded perspective of a hardened connector housing of the hardened optical fiber connector of FIG. 7.
Figure 9:
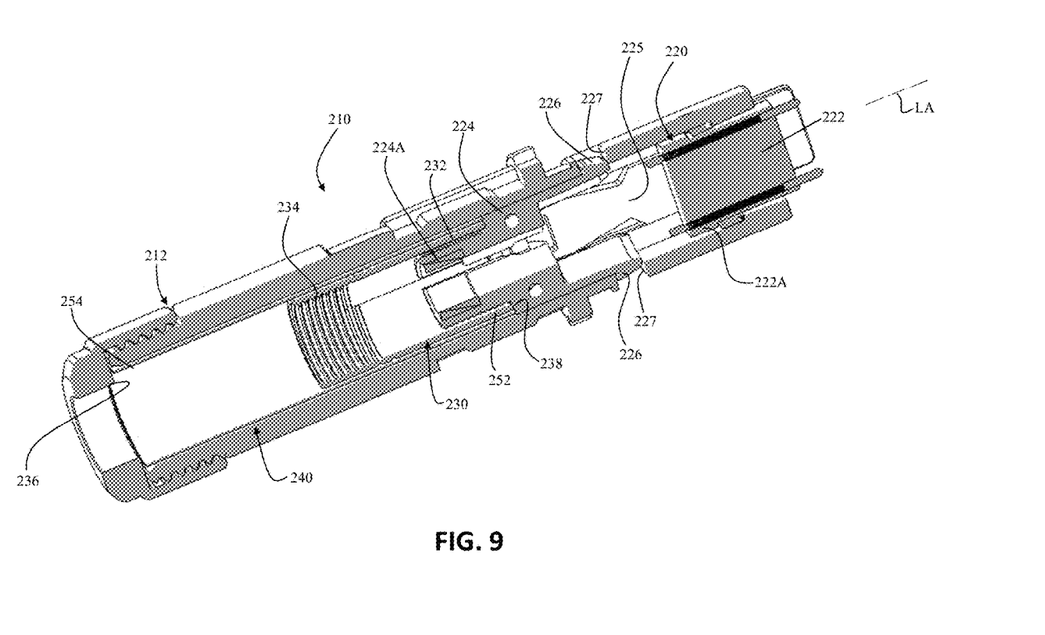
FIG. 9 is a cross-sectional perspective of the hardened optical fiber connector of FIG. 7 shown in vertical longitudinal section with parts removed.

Referring to FIGS. 7-9, another embodiment of a hardened optical fiber connector in the scope of the present disclosure is generally indicated at reference number 210. The hardened optical fiber connector 210 is similar in many respects to the connector 110, and corresponding parts will be given the same reference number, plus 100. Like the connector 110, the optical fiber connector 210 is configured to terminate the optical fiber cable C (not shown in FIGS. 7-9). The connector 210 comprises a hardened connector housing 212 configured to support the same type of fastener and seal as the connector housing 112 discussed above. The fastener and seal are removed in FIGS. 7-9 to show other elements more clearly. The hardened connector 210 further comprises an inner connector assembly 220 received in a crimp ring 230 and then the hardened connector housing 212. The illustrated crimp ring 230 does not have the same extended length configuration as the crimp ring 130. Instead, the crimp ring 230 has essentially the same configuration as the crimp ring 30 of the prior art hardened connector 110. Instead of an extended-length crimp ring, the hardened optical fiber connector 210 is equipped with a separate rear bracing member 240 for bracing the inner connector assembly 220 and crimp ring 230 against the hardened connector housing 212 when tension is imparted on the cable C.

The hardened connector housing 212 has front end portion and a rear end portion spaced apart along a longitudinal axis LA. The rear end portion of the hardened connector housing comprises a forward facing internal shoulder 236 (FIG. 9) used with the bracing member 240 for bracing the inner connector assembly 220. The hardened connector housing 212 comprises a plug body 212A defining the front end portion of the hardened connector housing and a core holder 212B configured to fasten to the plug body (e.g., threadably connect to the rear end portion of the plug body) and define the rear end portion of the connector housing. In the illustrated embodiment, the core holder 212B again defines the forward facing internal shoulder 236. The hardened connector 210 is configured so that the cable C enters through an opening at the rear end of the connector housing 212 circumscribed by the shoulder 236. The plug body 212A further comprises latch recesses 227 (broadly, latch elements) for latching with the inner connector assembly 220.

Similar to the inner connector assembly 120, the inner connector assembly 220 comprises at least one optical fiber ferrule 222, a ferrule spring (not shown), and a back body 224. In the illustrated embodiment, the ferrule 222 is an MT ferrule, but it is contemplated that the hardened connector could also be equipped with inner connector assemblies comprising other types of ferrules (e.g., inner connector assemblies comprising (i) an MT ferrule; (ii) an ST ferrule; or (iii) duplex LC ferrules are expressly contemplated herein). The ferrule 222 is exposed through the front end portion of the hardened connector housing 212 for making an optical connection when the plug body 212A is plugged into an adapter. The back body 224 comprises first and second latch hooks 226 (broadly, latch elements) that latch with the recesses 227 to secure the back body to the hardened connector housing 212. More broadly, the back body 224 comprises a first latch element 226 and the hardened connector housing 212 comprises a complementary second latch element 227 configured to cooperate with the first latch element to secure the back body to the hardened connector housing. The ferrule spring (not shown) is compressed between the back body 224 and the rear end of the ferrule 222 to yieldably bias the ferrule forward in relation to the back body. FIG. 7 shows how the back body 224 is connected to ferrule retention arms 225 that engage the front end of the flange 222A of the ferrule 222 to form a stop against which the ferrule spring presses the ferrule forward. Other ways of holding the ferrule in place against the biasing force of the ferrule spring can also be used without departing from the scope of the disclosure. The back body 224 comprises a back post 224A on which the at least one strength member S of the cable C can be secured via the crimp ring 230. In addition, the back body 224 comprises a rearward facing shoulder 238 used with the bracing member 240 for bracing the inner connector assembly 220. As The crimp ring 230 functions similar to the crimp ring 30 described above. The crimp ring 230 comprises a front portion 232 that is crimped onto the back post 224A to secure the strength members of the cable (not shown) to the back post 224A. A back portion 234 of the crimp ring 230 is crimped onto the cable jacket J. As shown in FIG. 9, the back portion 234 of the crimp ring 230 is spaced apart from the forward facing shoulder 236 along the longitudinal axis LA. In other words, there is a longitudinal gap between the forward facing shoulder 236 and the back end 234 of the crimp ring 230.

The bracing member 240 comprises a tubular shape disposed concentrically about the longitudinal axis LA and crimp ring 230. The bracing member 240 comprises a front end portion 252 and a rear end portion 254 spaced apart along the longitudinal axis LA. The front end portion 252 is configured to engage the rearward facing shoulder 238 of the back body 224, and the rear end portion 254 is configured to engage the forward facing shoulder 236 of the hardened connector housing 212. Like the extended-length crimp ring 130, the bracing member 240 braces the back body 224 against rearward displacement along the longitudinal axis LA relative to the hardened connector housing 212. During use, when tension is imparted on the cable C, the bracing member 230 transfers the tension to the inner back body 224, but the hooks 226 do not bear the full load. Instead, the rearward facing shoulder 238 presses backward on the bracing member 240, which in turn presses backward on the forward facing shoulder 236. The bracing member 240 transfers the tension load from the cable to the hardened connector housing 212 via the forward facing shoulder 236, and displacement of the hooks 226 in the recesses 227 is inhibited. Because the forward facing shoulder 226 is more substantial than the hooks 226, the hardened connector 110 can effectively transfer greater cable tension through the hardened connector housing 212 to the adapter, without imparting tension on the sensitive fibers F or ferrule 222.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A connector for terminating a cable comprising:
   a connector housing having a front end portion and a rear end portion spaced apart along a longitudinal axis, the rear end portion of the connector housing including a first shoulder;
   an inner connector assembly received in the connector housing, the inner connector assembly including at least one ferrule exposed through the front end portion of the connector housing for making an optical connection, the inner connector assembly further comprising a back body comprising a back post;

at least one strength member secured to the back post; and a rear bracing member received in the connector housing, the rear bracing member having a front end portion and a rear end portion spaced apart along the longitudinal axis, the front end portion of the rear bracing member being configured to engage the back body and the rear end portion of the rear bracing member being configured to engage the first shoulder of the connector housing such that the rear bracing member substantially braces the back body against rearward displacement along the longitudinal axis relative to the connector housing, where the front end portion of the rear bracing member is crimped onto the back post.

2. The connector as set forth in claim 1, where the rear bracing member comprises a tubular shape that extends circumferentially about the longitudinal axis.

3. The connector as set forth in claim 1, further comprising a crimp ring crimped onto the back post, the front end portion of the rear bracing member being disposed concentrically about the crimp ring.

4. The connector as set forth in claim 3, where the back body comprises a second shoulder, the front end portion of the rear bracing member engaging the second shoulder.

5. The connector as set forth in claim 1, where the back body comprises a first latch element and the connector housing comprises a complementary second latch element configured to cooperate with the first latch element to secure the back body to the connector housing.

6. The connector as set forth in claim 1, where the connector housing comprises a plug body defining the front end portion of the connector housing and a core holder configured to connect to the plug body, the core holder defining the first shoulder.

7. The connector as set forth in claim 1, wherein the at least one ferrule is one of: (i) an MT ferrule; (ii) an ST ferrule; and (iii) duplex LC ferrules.

* * * * *